United States Patent [19]

Graf et al.

[11] Patent Number: 5,086,603
[45] Date of Patent: Feb. 11, 1992

[54] BODY SIDE MOLDING ASSEMBLY THAT COMPENSATES FOR THERMAL EXPANSION

[75] Inventors: Edward J. Graf, Oxford; Robert Hancz, Troy, both of Mich.; Zinovy Tyves, Tecumseh, Canada

[73] Assignee: General Motors Corporation, Detroit, Mich.

[21] Appl. No.: 651,873

[22] Filed: Feb. 7, 1991

[51] Int. Cl.⁵ .............................................. E04F 19/02
[52] U.S. Cl. .................................. 52/718.1; 52/717.1
[58] Field of Search .............. 52/716, 718, 717, 717.1, 52/718.1

[56] References Cited

U.S. PATENT DOCUMENTS 4,800,699 1/1989 Lang ................................. 52/717.1

Primary Examiner—Richard E. Chilcot, Jr.
Assistant Examiner—Wynn Wood
Attorney, Agent, or Firm—William A. Schuetz

[57] ABSTRACT

A molding assembly in which an elongated plastic molding is anchored to a vehicle door via a central clip and slidably supported by end clips so that thermal expansion and contraction takes place evenly from the midpoint of the molding so that the ends of the molding are always evenly spaced from the front and rear edges of the door.

4 Claims, 2 Drawing Sheets

BODY SIDE MOLDING ASSEMBLY THAT COMPENSATES FOR THERMAL EXPANSION

The present invention relates to a body side molding assembly for automotive vehicles and, more particularly, to a body side molding assembly in which longitudinal thermal expansion and contraction of the molding takes place evenly from its longitudinal midpoint.

The present inventions provides a novel molding assembly for use in body side panels, such as doors, of automotive vehicles.

It is common to provide decorative molding assemblies which extend horizontally across vehicle doors on their exterior sides. These moldings are usually anchored adjacent the front edge of the door panel and supported by plastic clips at spaced longitudinal locations along their longitudinal extent. These clips allow the molding to migrate or longitudinally expand due to thermal expansion or contraction, the molding sliding relative to the clips. To avoid having too much expansion or contraction and create an uneven gap between the ends of the molding and the front and rear edges of the door panel, the type of plastic used for the moldings has to be such that little migration due to thermal expansion and contraction can take place. This eliminates the use of some plastic materials which have higher thermal expansion and contraction rates and/or which are less expensive.

In accordance with the provisions of the present invention, a novel molding assembly is provided in which the plastic molding is anchored to the door panel midway between the front and the rear edges of the door and which is supported so as to allow thermal expansion and contraction evenly from its longitudinal midpoint so that the ends of the molding are always evenly or substantially evenly spaced from their respective adjacent front or rear edges of the door. This allows for the use of plastic materials for the molding which have high thermal expansion and contraction rates and which, in some cases, are less expensive than moldings heretofore used.

The present invention further resides in various novel constructions and arrangement of parts, and further novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the views, and in which.

Figure 1:
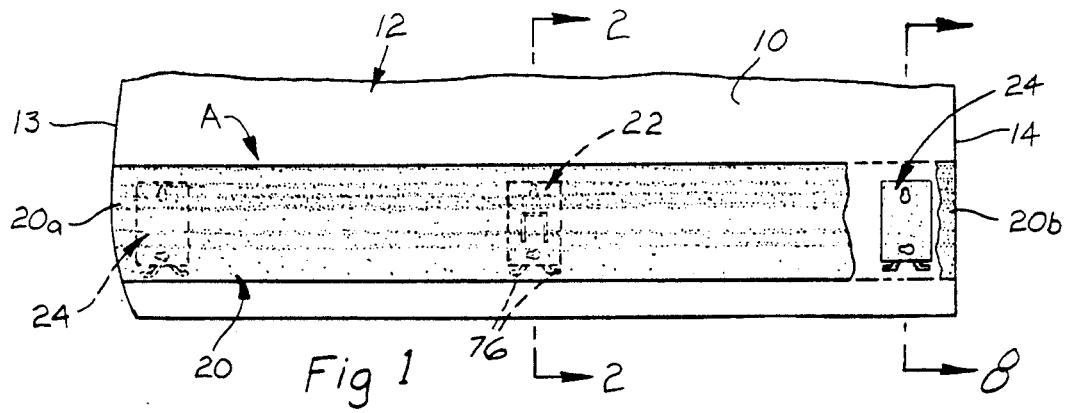
FIG. 1 is a fragmentary side elevational view of a vehicle and showing the novel molding assembly of the invention mounted thereto.
Figure 4:
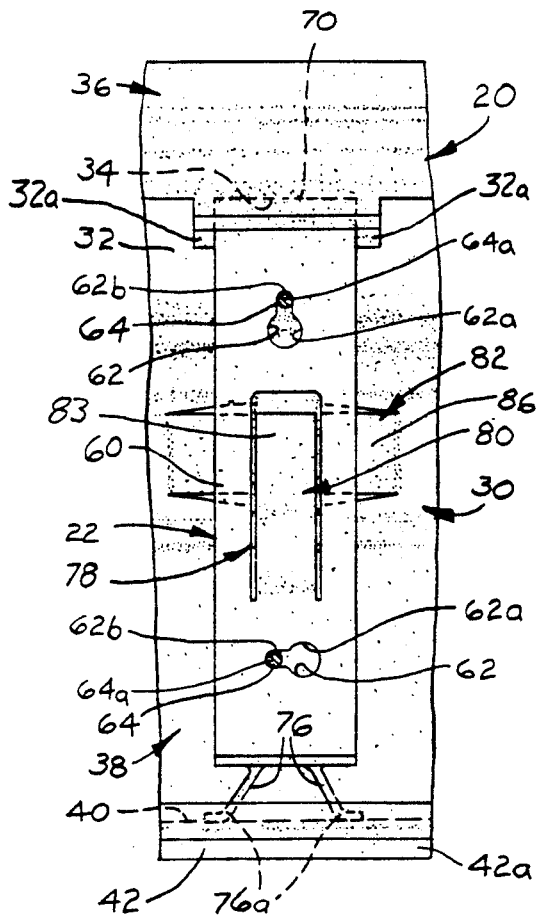
FIG. 4 is a fragmentary sectional view taken along the line 4—4 of FIG. 2.
Figure 6:
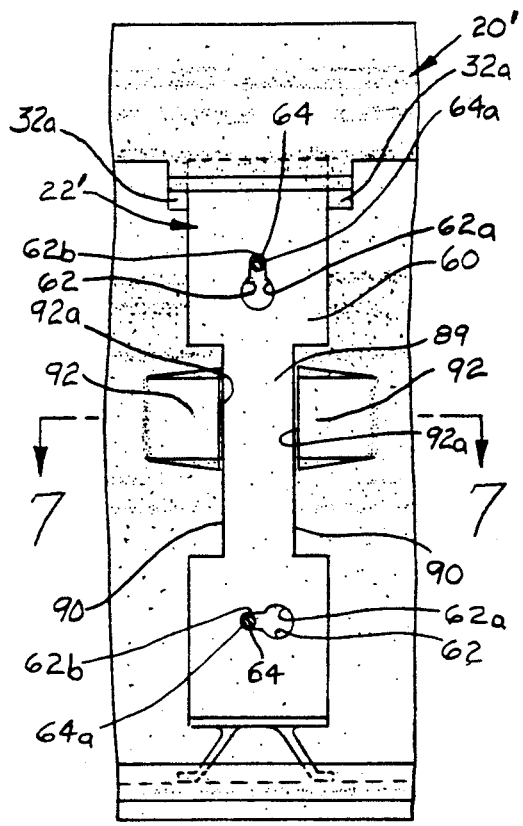
Figure 7:
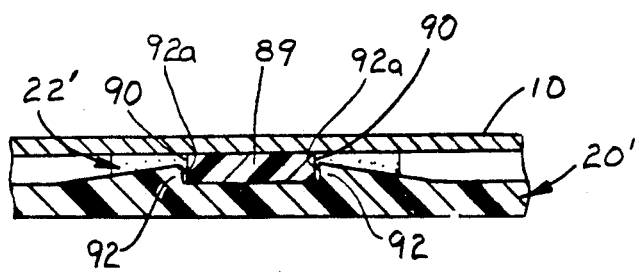
Figure 8:
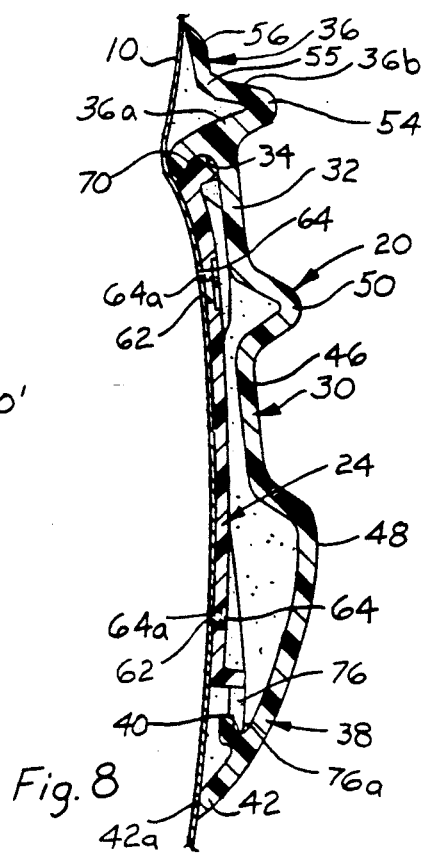

FIG. 6 an enlarged fragmentary sectional view like that shown in FIG. 4, but showing a second embodiment of the molding assembly of the present inventions;

FIG. 7 is an enlarged fragmentary sectional view taken along lines 7—7 of FIG. 6; and FIG. 8 is an enlarged fragmentary sectional view taken along the lines 8—8 of FIG. 1.

The present invention provides a novel decorative molding assembly A which is mountable on an exterior panel of an automotive vehicle. The molding assembly A could be used in conjunction with various outer vehicle panels, but, as shown in FIG. 1, is preferably used for mounting to an exterior vehicle door panel 10 of a vehicle door 12. The vehicle door 12 could be of any suitable or conventional construction and is hereshown as including an outer side panel 10 having front and rear edges 13 and 14.

The novel molding assembly A comprises, in general, an outer decorative plastic molding 20, a first plastic spring clip 22 which is adapted to be mounted on the door panel 10 and which functions to locate and anchor the outer molding 20 in place on the door panel 10, and second or end spring clips 24 for supporting the outer molding 20 adjacent its forward end 20a and adjacent its rearward end 20b and in a manner in which it permits the molding 20 to slide longitudinally relative thereto.

The first spring clip 22 is located and anchored at the longitudinal midpoint of the outer molding 20 and at the longitudinal midpoint between the front and rear edges 13 and 14 of the door panel 10 so that the front edge or end 20a and the rear edge or end 20b of the molding 20 are flush with or evenly spaced inwardly from the front and rear edges 13 and 14 of the door panel 10, respectively. By anchoring the molding 20 at its longitudinal midpoint any longitudinal movement of the molding 20 due to thermal expansion or contraction will be even from the longitudinal midpoint so that any gap between the end 20a and the front edge 13 and the end 20b and the rear edge 14 of the door panel 10 will always be even.

Figures 2, 3:
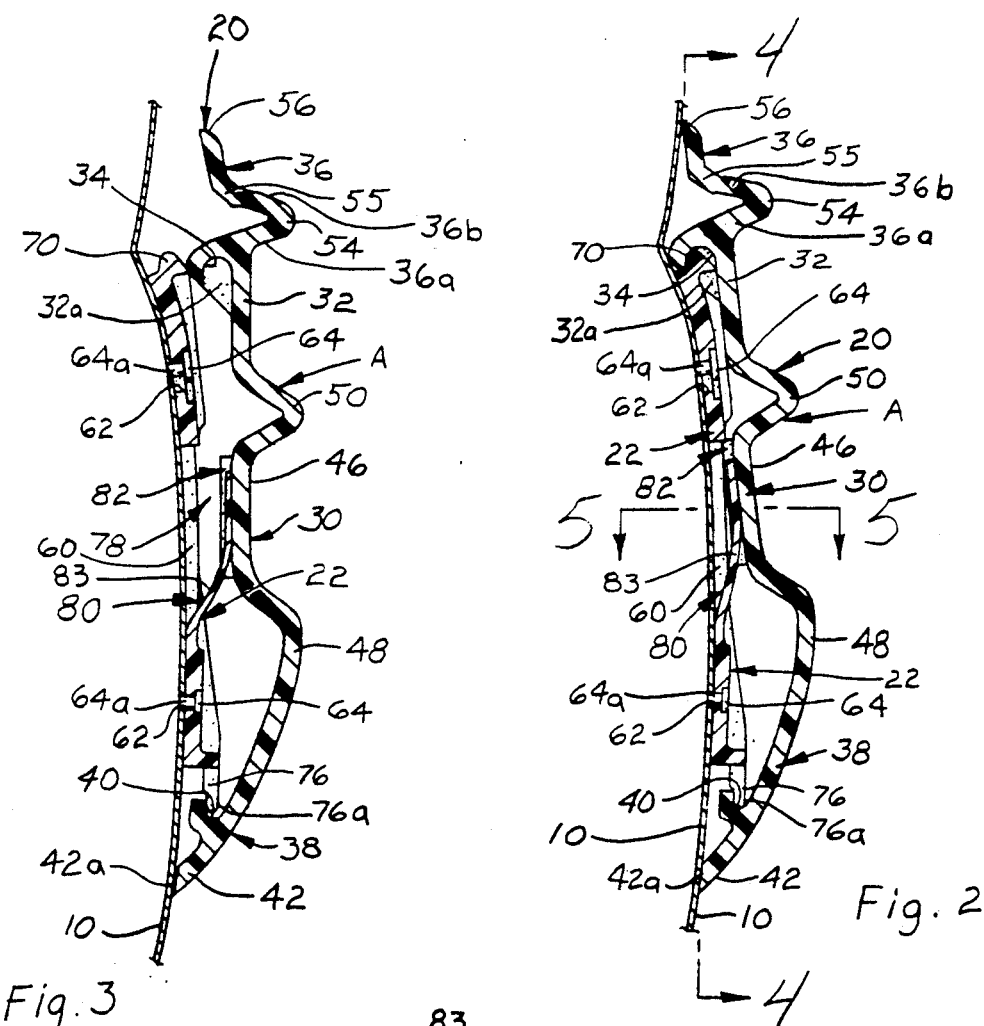
FIG. 2 is an enlarged fragmentary sectional view taken along 2—2 of FIG. 1.
FIG. 3 is a fragmentary sectional view like that shown in FIG. 2, but showing the relative position of parts of the molding assembly as it is being attached to the door panel.
Figure 5:
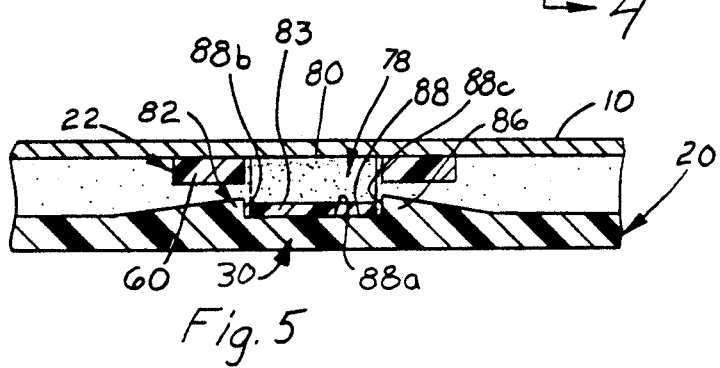
FIG. 5 is an enlarged fragmentary sectional view taken along lines 5—5 of FIG. 2.

The aesthetic molding 20 could be made of any suitable or conventional plastic material which, when molded, is substantially rigid, but yet has some flexibility both longitudinally and laterally. The molding 20, as viewed in vertical cross-section as shown in FIGS. 2 and 3, comprises a midportion 30, and intermediate upper portion 32 which defines a channel 34 facing downwardly, an upper flexible end portion 36, a lower intermediate portion 38 which defines an upwardly facing channel 40, and a lower end portion 42. The midportion 30 could simply be convex or curved in shape, but as shown in FIGS. 2 and 3 of the drawings, is preferably molded to have a more decorative appearance. As shown in FIGS. 2 and 3, the midportion 30 is indented to define a longitudinally extending recess 46, a hump portion 48 adjacent the bottom of the recess 46 and an outwardly projecting portion 50 adjacent the upper end of the recess 46.

The upper end portion 36 of the molding 20 is generally V-shaped in cross-section to define legs 36a and 36b integrally joined at a bight 54. The leg 36a is integral with the upper intermediate portion 32 and the leg 36b is curved at 55 so as to be flexible about the longitudinal axis of its curve 55. The upper end 56 of the leg 36b of the molding 20 is adapted to engage the outer door panel 10 when connected thereto and be flexed outwardly of the panel 10 so as to provide a tight engagement with the panel 10. The lowermost portion 42 is curved and has a free end 42a which is also engageable with the outer door panel 10 when the molding 20 is attached thereto.

The molding 20 is adapted to be mounted to the outer door panel via the mounting clips 22 and 24. The mounting clip 22 serves to locate and anchor the molding 20 to the door panel 10. In the FIGS. 1-5 embodiment, the mounting clip 22 is in the form of a bull horn spring clip having a generally rectangular shape. The clip 22 comprises a generally planar, rectangularly shaped central body portion 60 which is provided with a pair of through key hole slots 62 adjacent its upper and lower ends which are adapted to receive headed studs 64 welded or otherwise suitably secured to the metal outer body panel 10. The clip 22 would be attached to the door panel 10 by positioning the enlarged portion 62a of the key hold slots 62 over the headed studs 64 and then positioning the clip 22 so that the shank 64a of the studs 64 is received in the smaller portion 62b of the key hole slots 62 to hold the clip 22 in place. As best shown in FIGS. 2 and 3, the clip 22 at its upper end has a bead or rounded projection 70 extending upwardly from the main body portion 60. The clip 22 at its lower end has a pair of projecting deflectable legs or fingers 76. The legs 76 are integral with the main body portion 60 at its lower end and extend downwardly therefrom, but diverge away from one another. As best shown in FIG. 3, the molding 20 is attached to the first clip 22 by first positioning the lower portion 42 of the molding 20 against the door panel 10 and then moving the molding 20 upwardly so that the feet 76a of the legs 76 of the clip 22 are received within the channel 40 defined by the intermediate portion 38. The molding is then further moved upwardly to cause the legs 76 to be deflected away from each other as well as moved towards the door panel 10 so that the upper intermediate portion 32 engages the projection 70 on the molding clip 22. The intermediate portion 32 of the molding 20 is then force fitted over the projection 70 until the projection 70 is received within the channel 34 defined by the upper intermediate portion 32, as shown in FIG. 2. When this occurs the upper leg 36b will have engaged the door panel 10 and have been deflected away therefrom so as to tightly engage the door panel 10. The legs 76 will provide a downward biasing force on the lower intermediate portion 38 to at all times maintain the channel 34 of the upper intermediate portion 32 positioned over the projection 70 to maintain the molding 20 anchored to the clip 22.

To prevent the molding 20 from moving longitudinally along the door panel 10 relative to the first clip 22, a locating and retaining means 78 is provided. The locating and retaining means 78 comprises cooperable means 80 and 82 on the molding clip 22 and the molding 20, respectively, which function to locate the molding 20 longitudinally relative to the door panel 10 and to retain it against longitudinal movement relative thereto. To this end, the cooperable means 80 on the molding clip 22 comprises a deflectable finger or tab 83 which, in the as-molded condition, is located out of the plane of the main body portion 60 of the molding clip 22 and is integrally connected with the main body portion 60 at its lower end. This deflectable finger 83 is free at its sides and upper end so as to be deflectable toward and away from the plane of the main body portion 60. As clearly shown in FIGS. 4 and 5, the cooperable means 82 on the molding 20 comprises integral raised portions or ramps 86 defining a recess 88 therein at its rearward side or surface which faces toward the exterior side of the door panel 10. The raised portions 86 are located intermediate the ends 20a, 20b of the molding 20. When the molding 20 is being attached to the molding clip 22, the deflectable finger 83 will be received within the recess 88 and be deflected by the surface 88a defining the bottom of the recess 88 in the raised portions 86 toward the door panel 10 by the molding 20 as it is being mounted thereto. This finger 83 will thereafter be engageable with the side surfaces 88b and 88c of the raised portion 86 defining the recess 88 to prevent longitudinal shifting movement of the molding 20 relative thereto. In addition to the retention means 78, the intermediate portion 32 of the molding 20 is provided with a pair of longitudinally spaced ribs 32a which straddle the projection 70 of the clip 22 (see FIGS. 3 and 4). The ribs 32a extend laterally of the intermediate portion and across the channel 34. Cooperation between the ribs 32a and clip 22 increases the retention strength of the molding 20 to the clip to further prevent longitudinal shifting movement of the molding 20 relative to the clip 22.

The second or end molding clips 24 are of an identical construction to the molding clip 22 except that no ribs 32a are provided on the intermediate portion 32 of the molding 20 and except that no fingers 83 are provided and the molding 20 has no corresponding raised portion 86 with a recess 88 adjacent its ends to prevent longitudinal movement of the molding 20 relative to the clips 24. The molding 20 is connected to the clips 24 and the clips 24 serve to support the molding 20 on the door panel 10 in the same manner as the clip 22, except that the molding 20 can slide longitudinally relative thereto due to thermal expansion and contraction. It should also be noted that clip 22 could be used in place of clip 24 if no ribs 32a or raised portions 86 are provided on the molding 20. The deflectable finger 83 would then merely slide relative to the molding 20 during relative longitudinal shifting movement therebetween.

FIGS. 6 and 7 show an alternate embodiment 22' of the first or central molding clip. This molding clip 22' differs from the previously described molding clip 22 in that the flexible finger 83 of the molding clip 22 is eliminated and the main body portion 60, as molded, has a reduced width portion 89 which defines a pair of spaced recesses 90 in its sides which face in opposite directions. The molding clip 22' is attached to the door panel 10 in the same manner as the molding clip 22 and it is connected to an outer molding 20' in the same manner. The molding 20' in this embodiment is identical to the molding 20 except that it would be provided with a pair of spaced apart tapered ramps or portions or tabs 92 which extend rearwardly from the side surface of the molding 20 i.e., the side which faces toward the door panel 10. The ramps 92 have side surfaces 92a which face toward each other.

When the molding 20' is attached to the molding clip 22', the reduced width portion 89 defined by the recesses 90 in the molding clip 22' is received between the side surfaces 92a of the tapered ramps 92 so as to position the molding 20 on the door panel 10 and so as to prevent relative longitudinal movement of the molding 20' relative to the door panel 10. This latter movement is prevented due to the fact that the reduced thickness portion 89 would engage the sides 92a of the ramps 92.

From the foregoing, it should be apparent that novel molding assemblies have been provided for an exterior vehicle panel, preferably a door panel 10 of the vehicle. These molding clip assemblies each have a first clip 22 or 22' which functions to locate and position the molding 20, 20' on the vehicle door panel 10 and second clips 24 for supporting the molding 20, 20' adjacent its opposite ends, but which allows for the molding 20, 20' to slide longitudinally relative thereto. This enables plastic materials to be used which will expand and contract evenly from the central part of the molding 20, 20' so that any gap between the ends of the molding 20, 20' and the adjacent side edges 13, 14 of the door 12 will always be even.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. A molding assembly for attachment to a vehicle body panel comprising:

a plurality of fastener clips including first and second end clips and an intermediate clip which are adapted to be mounted to the body panel at spaced longitudinal locations thereon, each of said clips having a body portion, a projection at one end of the body portion and a projecting flexible leg at the opposite end of the body portion, an elongated plastic molding having a front surface, a rear surface and means integral with the rear surface which define a pair of spaced channels facing toward each other, one of said channels receiving said flexible legs of said clips when the molding is being attached to said clips, the other of said channels receiving said projections at said one end of said clips when the molding is moved in a direction to deflect said flexible legs and then moved to cause said means defining said other channel to be snap fitted over said projections to retain the molding on said clips, and first and second cooperable means integral with said intermediate clip and said rear side of said elongated molding adjacent its longitudinal midpoint, respectively for positioning said molding relative to said panel and for preventing longitudinal movement of said elongated molding relative to said intermediate clip, said first cooperable means on said intermediate clip defining a pair of oppositely facing side surfaces, said second cooperable means on said molding comprising a pair of raised portions defining a recess whose side surfaces face toward each other, said side surfaces of said first cooperable means being received within said recess between said raised portions when the molding is attached to said intermediate clip whereby engagement between the side surfaces of said first and second cooperable means prevents longitudinal movement of said molding relative to said intermediate clip, said end clips permitting longitudinal sliding movement of said molding relative thereto whereby linear thermal expansion and contraction of said molding takes place evenly from said midpoint of said molding.

2. A molding assembly for attachment to an exterior vehicle side door panel having front and rear side edges comprising:

a plurality of fastener clips including first and second end clips and an intermediate clip which are adapted to be mounted to the side door panel adjacent its front and rear edges and midway between its side edges, respectively, each of said clips having a body portion, a projection at one end of the body portion and a projecting flexible leg at the opposite end of the body portion, an elongated plastic molding having a front surface, a rear surface and means integral with the rear surface which define a pair of spaced channels facing toward each other, one of said channels receiving said flexible legs of said clips when the molding is being attached to said clips, the other of said channels receiving said projections at said one end of said clips when the molding is moved in a direction to deflect said legs and then moved to cause said means defining said other channel to be snap fitted over said projections to retain the molding on said clips, and first and second cooperable means integral with said intermediate clip and said rear surface of said molding adjacent its longitudinal midpoint, respectively, for positioning said molding relative to said panel so that the molding has its ends spaced equally from the front and rear edges of the door panel and for preventing longitudinal movement of said elongated molding relative to said intermediate clip, said second cooperable means on said molding comprising a pair of spaced raised ramps defining side surfaces which face toward one another and said first cooperable means comprises a pair of spaced vertical side surfaces on the body portion of said intermediate clip which are received between said side surfaces of said raised ramps on the molding whereby said molding is retained against longitudinal movement relative to said intermediate clip, said end clips permitting longitudinal sliding movement of said molding relative thereto whereby linear thermal expansion and contraction of said molding takes place evenly from said midpoint of said molding so that the ends of the latter are always equally spaced form the side edges of the door panel.

3. A molding assembly for attachment to an exterior vehicle side door panel having front and rear side edges comprising:

a plurality of fastener clips including first and second end clips and an intermediate clip which are adapted to be mounted to the side door panel adjacent its front and rear edges and midway between its side edges, respectively, each of said clips having a body portion, a bead integral with one end of the body portion and which projects upwardly therefrom, and a projecting flexible leg at the opposite end of the body portion and which projects downwardly therefrom, an elongated plastic molding having a front surface, a rear surface and means integral with the rear surface which define a pair of spaced channels facing toward each other, one of said channels receiving said flexible legs of said clips when the molding is being attached to said clips, the other of said channels receiving said beads when the molding is moved in a direction to deflect said flexible legs and then moved to cause said means defining the other channel to be snap fitted over said beads, said beads and said legs retaining the molding on said clips, and cooperable means on said intermediate clip and said rear surface of said molding adjacent its longitudinal midpoint for positioning said molding on said panel so that the molding has its ends spaced equally from the front and rear edges of the panel so that longitudinal movement of said elongated molding relative to said intermediate clip is prevented, said cooperable means comprising a recess in said elongated molding which is open to said rear surface of said molding and a flexible finger formed integral with said body portion of said intermediate clip, said recess being defined by a bottom surface and a pair of side surfaces and said finger extending outwardly from said body portion of said intermediate clip a given distance when in its free state, said bottom of said recess engaging said flexible finger when the molding is being attached to said intermediate clip and causing the same to be deflected from its free state position in opposition to its self-biasing forces whereby the side surfaces of said recess straddle said finger to prevent longitudinal movement of said molding relative to said intermediate clip, said end clips permitting longitudinal sliding movement of said molding relative thereto whereby linear thermal expansion and contraction of said molding takes place evenly from said midpoint of said molding so that the ends of the latter are always equally spaced from the side edges of the panel.

4. A molding assembly, as defined in claims 1, 2 or 3, and wherein each clip has a pair of flexible legs and each pair of flexible legs diverge away from each other proceeding from the body portion of said clips toward their free ends.

* * * * *